US008521013B2

(12) United States Patent
Yoshimoto et al.

(10) Patent No.: US 8,521,013 B2
(45) Date of Patent: Aug. 27, 2013

(54) TEMPERATURE SENSING DEVICE AND HEATING DEVICE (75) Inventors: Tsuyoshi Yoshimoto, Chigasaki (JP);
Katsumi Yamane, Chigasaki (JP);
Tetsuhiro Ohno, Chigasaki (JP);
Takahiro Mizoguchi, Chigasaki (JP)

(73) Assignee: Ulvac, Inc., Chigasaki-shi (JP)

( * ) Notice: Subject to any disclaimer, the term of this patent is extended or adjusted under 35 U.S.C. 154(b) by 54 days.

(21) Appl. No.: 13/192,691

(22) Filed: Jul. 28, 2011

(65) Prior Publication Data
US 2012/0008925 A1   Jan. 12, 2012

Related U.S. Application Data (63) Continuation of application No. PCT/JP2010/051012, filed on Jan. 27, 2010.

(30) Foreign Application Priority Data

Jan. 28, 2009 (JP) ................................. 2009-016229

(51) Int. Cl.
*H05B 3/62* (2006.01)
(52) U.S. Cl.
USPC ........... 392/416; 219/483; 374/120; 374/147; 374/179; 392/417; 392/418
(58) Field of Classification Search
USPC .................. 219/121.43, 483–486, 494, 385; 156/345.52; 392/416–418; 118/724, 725; 374/120, 132, 133, 135, 121, 141, 147, 179
See application file for complete search history.

(56) References Cited

U.S. PATENT DOCUMENTS

| 7,453,051 | B2 * | 11/2008 | Timans | 219/390 |
| 2007/0086503 | A1 * | 4/2007 | Fujii | 374/1 |
| 2007/0283709 | A1 * | 12/2007 | Luse et al. | 62/259.2 |

FOREIGN PATENT DOCUMENTS

| JP | 7-207433 | 8/1995 |
| JP | 8-285699 | 11/1996 |
| JP | 2004-179355 A1 | 6/2004 |

OTHER PUBLICATIONS

International Search Report for International Application No. PCT/JP2010/051012 dated Apr. 21, 2010.

* cited by examiner

*Primary Examiner* — Geoffrey S Evans
*Assistant Examiner* — James Sims, III
(74) *Attorney, Agent, or Firm* — Kratz, Quintos & Hanson, LLP (57) ABSTRACT A technology to control temperature of a large substrate to be heated. A temperature sensing device is disposed lateral to a region where a radiation heater faces a substrate to be heated inside a heating chamber. A heating device has the heating chamber, the radiation heater, a power-supply device, a substrate-holding device, a control device, and the temperature sensing device. A control program is built into the control device, according to which the power-supply device controls the power applied to the radiation heater to generate heat such that the temperature of the temperature measurement substrate detected by a thermocouple of the temperature sensing device becomes a set temperature. Furthermore, a circulation passage is disposed in close contact with the temperature-sensing device, and with a coolant flowing through the circulation passage, the temperature of the temperature measurement substrate can be cooled from the set temperature to an initial temperature.

6 Claims, 6 Drawing Sheets

TEMPERATURE SENSING DEVICE AND HEATING DEVICE

This application is a continuation of International Application No. PCT/JP2010/051012, filed on Jan. 27, 2010, which claims priority to Japan Patent Application No. 2009-016229, filed on Jan. 28, 2009. The contents of the prior applications are herein incorporated by reference in their entireties.

BACKGROUND OF THE INVENTION

1. Field of the Invention

The present invention relates to a technology of controlling the temperature of an object to be heated by using radiation heat generated from a radiation heating means.

2. Description of the Background Art

An object to be heated (such, as glass substrate) and vacuum treated for forming a film thereon has been conventionally heated by a sheath heater attached in an object-to-be-heated placement table contacting the object during the treatment or a preliminary heating before the treatment. In this case, the temperature of the object to be heated is controlled, with the temperature of the object-to-be-heated placement table having been measured in a heating chamber, with the use of a program that controls the output of the heater based on the temperature of the placement table, a target temperature for heating, and a target time until such time as a target heating temperature is reached.

However, when the object to be heated contacts the placement table equipped with the sheath heater as a transmission heating means, particles may be generated due to friction between the surface of the heater and the glass substrate, or a film adhered to the surface of the heater may be peeled off during the treatment, which likely results in contamination of the product thereby causing deterioration of the production yield.

In addition, there has been a need for the heating treatment time to be shorter than in the past.

In this respect, a radiation heating means (such as, a lamp heater) can, in principle, raise the temperature of the object to be heated in a short heating time without contacting the object to be heated by means of radiation heating (see, Japanese Patent Document mentioned below).

In order to prevent heat loss through heat conduction from the object to be heated while the absorption rate of infrared rays on the object to be heated is enhanced in treatment apparatuses using such radiation heating means, instead of the use of the placement table for the conduction heating by means of the sheath heater, a vertical-substrate treatment apparatus in which the substrate is held by a carrier and both the carrier and the substrate are made to stand in the apparatus supports a glass substrate as the object to be heated by the carrier, while a horizontal-substrate treatment apparatus which treats a substrate with its horizontal posture held therein makes use of a pin having a minimized contact area with the object to be heated; and both the horizontal-substrate treatment apparatus and the vertical-substrate treatment apparatus have difficulties in measuring the heat by means of conventional temperature measuring mechanisms with only a glass substrate, as the object to be heated, being fixed inside the apparatus.

For the above reason, the temperature of the object to be heated has been controlled, with the temperature of a temperature measuring plate made of the same glass material as that of the glass substrate, which is the object to be heated, being measured, with the use of a program that controls the output of the heater based on the temperature of the temperature measuring plate, a target temperature for heating, and a target time until such a time as the target heating temperature is reached.

However, with the use of the conventional temperature measuring plate and the program, when the output of the radiation heating means is increased in order to increase the temperature rise rate of the glass substrate, accurate monitoring of the temperature-rise of the glass substrate cannot be attained due to a slow response of the temperature measuring plate, thereby causing a problem of overheating the glass substrate.

See, Japanese Patent Document JP-B 4071047.

SUMMARY OF THE INVENTION

The present invention has been created to solve the above drawbacks of the prior art, and an object of the present invention is to provide a technology for controlling the temperature of a substrate to be heated having a size larger than that in the conventional art.

The inventors of the present invention have found that when infrared rays are emitted into a glass substrate and a metallic temperature measurement substrate to heat them, the rates of the temperature rise of those substrates are approximately equal.

Moreover, with glass as the temperature measurement substrate, when the temperature of the temperature measurement substrate is lowered by providing a circulation passage for a coolant to flow through the temperature measurement substrate, it takes a long time to cool the temperature measurement substrate, so that the temperature of the glass substrate that is carried in and the temperature measurement substrate differ. However, inventors have also found that, when a metal is used for the temperature measurement substrate, and the circulation passage through which the coolant flows in the metal is provided, the temperature can be lowered to an initial temperature in a short period of time, due to a higher thermal conductivity of metal compared to that of glass.

The present invention has been created based on the above findings. An embodiment of the present invention is directed to a temperature sensing device including, in a vacuum chamber inside which vacuum heating treatment for heating a substrate to be heated by means of radiation takes place, a temperature measurement substrate; a circulation passage disposed in close contact with the temperature measurement substrate so as to make a coolant flow inside the circulation passage; and a temperature sensor provided to the temperature measurement substrate for measuring the temperature of the temperature measurement substrate. The temperature sensing device is such that the temperature outputted by the temperature sensor is detected when the temperature measurement substrate is irradiated with infrared rays; and the temperature measurement substrate and the substrate to be heated are made of different materials.

The present embodiment may be directed to a temperature sensing device, wherein the temperature measurement substrate is made of a metal.

The present embodiment may be directed to a temperature sensing device, wherein the temperature sensor is a temperature measuring part which generates an electromotive force for a thermocouple.

An embodiment of the present invention is directed to a heating device including a vacuum chamber inside which vacuum heating treatment for heating a substrate to be heated by means of radiation takes place; a substrate-holding device for holding the substrate to be heated in the vacuum chamber;

a radiation heating means, being disposed without contacting the substrate to be heated in the vacuum chamber; for irradiating the substrate to be heated with infrared rays, the temperature sensing device being disposed in a position outside a region where the radiation heating means and the substrate to be heated face each other, and in a position so as not to block the infrared rays with which the surface of the substrate to be heated is irradiated; a cooling device for supplying a coolant, which has been cooled, to the circulation passage; a power-supply device for applying power to the radiation heating means based on an input signal; and a control device, to which an output signal of the temperature sensing device is input, and which outputs a signal indicating the power as being input into the radiation heating means, to the power-supply device. The heating device is configured such that the amount of power as being applied to the radiation heating means is controlled based on the temperature of the temperature measurement substrate indicated by the output signal.

An embodiment of the present invention is directed to a method for heating a substrate, during which a substrate to be heated is carried into a vacuum chamber; and a surface of the substrate to be heated is irradiated with infrared rays by means of a radiation heating means being disposed without contacting the substrate to be heated in the vacuum chamber, to raise the temperature of the substrate to be heated. The temperature sensing device has been disposed in the vacuum chamber; and the amount of emission of infrared rays to the radiation heating means is controlled based on the temperature of the temperature measurement substrate indicated by the detection signal output by the temperature sensing device.

The present embodiment may be directed to a method for heating a substrate, in which the substrate to be heated is carried into the vacuum chamber with a temperature of at least 20 degrees Celsius and at most 30 degrees Celsius, the method for heating including the steps of: passing a coolant flowing though the circulation passage to make the temperature measurement substrate have a temperature of at least 20 degrees Celsius and at most 30 degrees Celsius; and thereafter, starting the heating of the substrate to be heated and the temperature measurement substrate by means of the radiation heating means.

EFFECT OF THE INVENTION

The present invention can raise the temperature of a glass substrate of a size larger than in the conventional art up to a target temperature by means of a radiation heating means within a time period shorter than the time period required by the conventional sheath heater. A cooling mechanism provided for the temperature measurement substrate enables the decrease of the temperature of the temperature measurement substrate down to a level of a substrate to be heated that is carried-in from outside the heating chamber, before being heated. It is also possible to lower the temperature of the temperature measurement substrate to the temperature of a substrate to be heated before being heated, each time a substrate to be heated is carried in, which allows the temperature of the substrate to be heated to be indirectly controlled, during the period of heating treatment of the substrate to be heated in the heating chamber.

During the time lapse from the start of heating to the target time, the relationships with respect to time, of the temperature of the temperature measurement substrate and the temperature of the substrate to be heated, has been determined in advance. When raising the temperature, if a measured temperature of the temperature measurement substrate is lower than a temperature expected in reference to the time, the amount of emission of infrared rays is increased by an amount determined by the relationship; and if a measured temperature of the temperature measurement substrate is higher than the temperature expected in reference to the time, the amount of emission of infrared rays is decreased by an amount determined by the relationship, in order to raise the temperature of the temperature measurement substrate along the expected temperature curve. In other words, since the degree of conformity in temperatures between the temperature measurement substrate and the substrate to be heated is high, the temperature of the substrate to be heated can be controlled by controlling the amount of emission of infrared rays in accordance with the temperature of the temperature measurement substrate, thereby the temperature of the substrate to be heated is raised up to a target temperature within a target time.

DETAILED DESCRIPTION OF THE PREFERRED EMBODIMENTS

<The Apparatus Used in the First Embodiment of the Present Invention>

Figure 1:
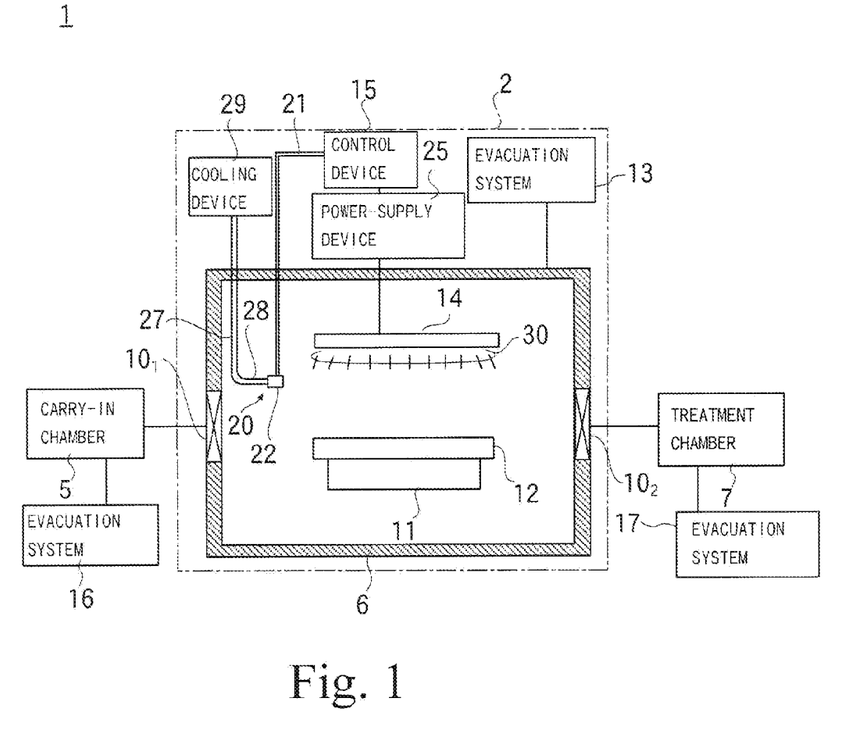
FIG. 1 is a cross-sectional view for illustrating the heating device used in an embodiment of the present invention.

In FIG. 1, the reference numeral 2 denotes a heating device. The heating device 2 has a heating chamber 6, a radiation heating means 14, a power-supply device 25, a substrate-holding device 11, a control device 15, and a temperature sensing device 20.

The radiation heating means 14 to be used in the present invention may be a heating device such as sheath heater which emits infrared rays and can heat the object to be heated without contacting the substrate to be heated. Among these kinds of radiation heating means 14, a lamp heater, which is capable of heating without contacting the object by radiation of infrared rays used as in this embodiment, is preferred because of its high radiation efficiency.

An evacuation system 13 is connected to the heating chamber 6, which can make the inside of the heating chamber 6 a vacuum atmosphere during operation thereof.

The radiation heating means 14 is disposed inside the heating chamber 6, while the power-supply device 25 is disposed outside the heating chamber 6. The radiation heating means 14 and the power-supply device 25 are airtightly connected by a power line so as to maintain the vacuum atmosphere in the heating chamber 6, so that the radiation heating means 14 generates heat to emit infrared rays by the activation of the power-supply device 25 to supply power to the radiation heating means 14. The reference numeral 30 in FIG. 1 denotes the emitted infrared rays.

The substrate holding device 11 is a table for placing a substrate disposed in the heating chamber 6, which is movable upward and downward with a glass substrate being maintained in a horizontal position, placed on a plurality of pins (not shown in the drawings) and protruding from inside the substrate holding device 11, and is designed such that it can move into and out from a position which faces the radiation heating means 14, by carrying the substrate onto and from the substrate placing table by means of a transfer mechanism (not shown in the drawings) such as, a transfer robot. Alternatively, the substrate holding device 11 can be disposed inside the heating chamber 6 in the role of a tray equipped with a truck or a roller conveyer in order to have it move into and out from the position facing the radiation heating means 14.

The control device 15 is disposed outside the heating chamber 6, while the temperature sensing device 20 is disposed inside the heating chamber 6; the control device 15 and the temperature sensing device 20 are airtightly connected by a conductive wire, while maintaining the vacuum atmosphere in the heating chamber 6.

The temperature sensing device 20 has a temperature measurement substrate 22 and a thermocouple 21.

The reference numeral 12 denotes a substrate to be heated.

The substrate to be heated 12 is a plate-shape glass substrate, a panel of plate-shape glass substrate with electrodes formed thereon, or the like; and the substrate to be heated 12 is disposed so as to face the radiation heating means 14. The temperature measurement substrate 22 is located at a side of the region where the substrate to be heated 12 and the radiation heating means 14 face each other, so as not to block the irradiation of the surface of the substrate to be heated with infrared rays.

The thermocouple 21 is in close contact with the temperature measurement substrate 22 at a junction thereof, as a temperature sensor 24, with the other end of the thermocouple 21 being connected to the control device 15. A voltage corresponding to the temperature of the temperature measurement substrate 22 is output to the control device 15 as a detection signal, thereby measuring the temperature.

The control device 15 stores a target temperature to be reached by heating the temperature measurement substrate 22 through the use of the radiation heating means 14, a target time that is from the start of heating to the time it reaches the target temperature, and the control program being configured based on the basic data described later, so that when a detection signal is delivered from the temperature sensing device 20 to the control device 15, the control program transmits a control signal. The control signal instructs to provide the radiation heating means 14 with an output power of the power-supply device 25, the output power being capable of enabling the temperature measurement substrate 22 to reach the target temperature by the target time in accordance with the detection signal as well as the temperature and the temperature rise rate of the temperature measurement substrate 22 determined by a plurality of detection signals being input in a continuous manner.

When the temperature of the temperature sensor 24 indicated by the detection signal varies, so does the output power being under control of the control signal.

The power-supply device 25 applies an electric current of a power corresponding to the input signal to the radiation heating means 14; and the radiation heating means 14 emits infrared rays at an intensity corresponding to the power. The emitted infrared rays enter both the temperature measurement substrate 22 and the substrate to be heated 12; and the temperature measurement substrate 22 is disposed in a position so as not to create shadows on the substrate to be heated 12.

Figure 2:
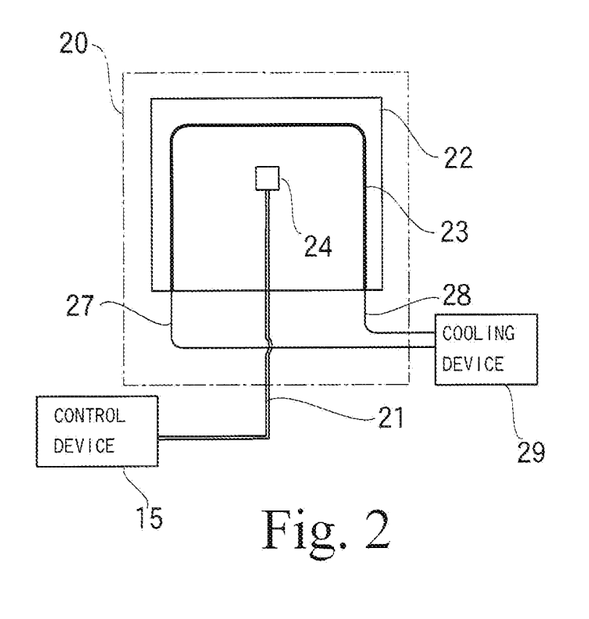
FIG. 2 is a schematic view of the temperature sensing device used in an embodiment of the present invention.

A circulation passage 23 is formed in close contact with the temperature measurement substrate 22. A cooling device 29 is disposed outside the heating chamber 6, and the circulation passage 23 and the cooling device 29 are airtightly connected to each other by a forward pipe 27 and a return pipe 28, with the vacuum atmosphere in the heating chamber 6 being maintained.

The cooling device 29 is filled with a coolant, which has been cooled by the cooling device 29 and passes through the forward pipe 27 to be supplied to the circulation passage 23, then flows through the circulation passage 23 to cool the temperature measurement substrate 22, and passes through the return pipe 28 to return to the cooling device 29, by which the coolant is cooled, and is supplied to the forward pipe 27, (FIG. 2).

<The Process Used in the Present Invention>

The reference numeral 1 in FIG. 1 is an example of the vacuum treatment apparatus, having a carry-in chamber 5, the heating chamber 6, and a treatment chamber 7. Each of the chambers 5 to 7 is connected in this order by gate valves $10_1$ and $10_2$, which are capable of opening and closing.

The gate valves $10_1$ and $10_2$ are closed, and then the evacuation system 13 connected to the heating chamber 6, and evacuation systems 16 and 17 connected respectively to the carry-in chamber 5 and the treatment chamber 7 are operated to evacuate the carry-in chamber 5, the heating chamber 6, and the treatment chamber 7 to vacuum, in order to make their inside vacuum atmosphere.

Each of the inside of the carry-in chamber 5 and the treatment chamber 7 has a transfer mechanism (not shown in the drawings); a substrate to be heated with a room temperature, which is at least 20 degrees Celsius and at most 30 degrees Celsius, is placed on the transfer mechanism in the carry-in chamber 5, then the gate valve $10_1$ between the carry-in chamber 5 and the heating chamber 6 is opened to place the substrate to be heated on the substrate-holding device 11 being located in the position near the gate valve $10_1$ in the heating chamber 6.

The reference numeral 12 denotes the substrate to be heated as being placed on the substrate-holding device 11.

The substrate-holding device 11 with the substrate to be heated 12 placed thereon is moved to a position which faces the radiation heating means 14 being located inside the heating chamber 6 so as to come to rest.

The control program is operated to send a control signal from the control device 15 to the power-supply device 25 to control the output of the radiation heating means 14 to emit infrared rays, in order to heat the substrate to be heated 12. At this time, the temperature measurement substrate 22 is also heated.

The target temperature at this stage is set to 120 degrees Celsius or higher, preferably at least 140 degrees Celsius and at most 160 degrees Celsius. The temperature sensing device 20 detects the temperature of the temperature measurement substrate 22 to input a detection signal to the control device 15 which changes power of the radiation heating means 14, thereby starting the heating of the substrate to be heated 12.

During the heating of the substrate to be heated 12, coolant is not introduced to the circulation passage 23, so that the temperature measurements substrate 22 is not cooled.

The temperature measurement substrate 22 starts temperature rise from a temperature which is approximately the same as that of the substrate to be heated 12, so that the temperature measurement substrate 22 and the substrate to be heated 12 are configured such that the difference of the speed in which the temperature rises becomes small. Once the temperature measurement substrate 22 reaches the target temperature from the start of the heating within the target time, the substrate to be heated 12 also reaches the target temperature from the start of heating within the target time.

After the temperature measurement substrate 22 has reached the target time, the substrate-holding device 11 is moved into the vicinity of the gate valve 10₂ which is between the heating chamber 6 and the treatment chamber 7, and the gate valve 10₂ is opened to have the transfer mechanism inside the treatment chamber 7 transfer the substrate to be heated 12 which is placed thereon into the treatment chamber 7.

On the part of the temperature measurement substrate 22, after the temperature of the temperature measurement substrate 22 has been elevated to the target temperature to stop the heating of the substrate to be heated 12, the coolant is circulated through the circulation passage 23 to cool the temperature measurement substrate 22 to the room temperature which is at least 20 degrees Celsius and at most 30 degrees Celsius, and then the circulation of coolant stops.

When the substrate to be heated 12 with its temperature raised is carried out from the heating chamber 6, another substrate to be heated for the next treatment is carried into the heating chamber 6. Such a substrate to be heated is also set at room-temperature of at least 20 degrees Celsius and at most 30 degrees Celsius, so that heating of the substrate to be heated is started from a state where the temperatures of the substrate with the room temperature as being carried into the heating chamber 6 and the temperature measurement substrate 22 are approximately the same, with the substrate to be heated and the temperature measurement substrate 22 being heated at the same rate of temperature rise.

Thus, the temperature measurement substrate 22 and the substrate to be heated 12 raise in temperature at the same rate starting from the same temperature, which makes it possible to measure the temperature of the substrate to be heated 12 by measuring the temperature of the temperature measurement substrate 22 the temperature of the substrate to be heated 12; accordingly, every time anew substrate to be heated is carried into the heating chamber 6, the temperature of the substrate to be heated can be raised to the same target temperature within the same target time by using the same control program.

Although the coolant is kept flowing through the circulation passage 23 in conducting an experiment to be described later, in this process the coolant may be flowed but does not need to be flowed during the heating, because the temperature rise rates of the metallic temperature measuring plate is approximately the same when heating by the radiation heating means 14 without the coolant flowing.

Furthermore, even when the difference between the temperature curve of the substrate to be heated 12 and that of the temperature measurement substrate 22 is increased by a change of the degree of vacuum inside the heating chamber 6, the magnitude of the difference does not vary by changing substrates, which makes it possible to predetermine the target temperature of the temperature measurement substrate 22 by determining the temperature of the substrate to be heated 12 based on the temperature of the temperature measurement substrate 22.

Since the temperature sensor 24 cannot be attached directly or be in contact with the substrate to be heated 12, the temperature sensor 24 is attached to the substrate to be heated 12 before entering the process, and the correlationship between the predetermined temperature of the substrate to be heated 12 and the temperature of the temperature measurement substrate 22 to produce a control program aimed at having the temperature measurement substrate 22 reach the target temperature within the target time and maintaining the target temperature.

<Experiment>

A glass substrate, which is 3 meters long and 3 meters wide, was used as the substrate to be heated 12; thermocouples 21 were set at seven places on the surface of the substrate to be heated 12; a stainless steel plate (SUS304) was used as a temperature measurement substrate 22; and the substrate to be heated and the temperature measurement substrate are heated by the radiation heating means 14 to measure the temperature of the temperature measurement substrate 22 as being heated.

In this experiment, the distance between the substrate to be heated 12 and the radiation heating means 14 was 50 mm; the distance between the radiation heating means 14 and the temperature sensor 24 as being the temperature measuring part for generating thermal electromotive force of the thermocouple 21 was 25 mm.

With the amount of generated heat emitted from the radiation heating means 14 being controlled through the use of the program that has set the target temperature of the temperature measurement substrate 22 to 140 degrees Celsius, the temperature measurement substrate 22 and the substrate to be heated 12 are heated. The temperature sensors were arranged respectively at seven different places on the substrate to be heated 12 to determine the average temperature thereof.

Figure 3:
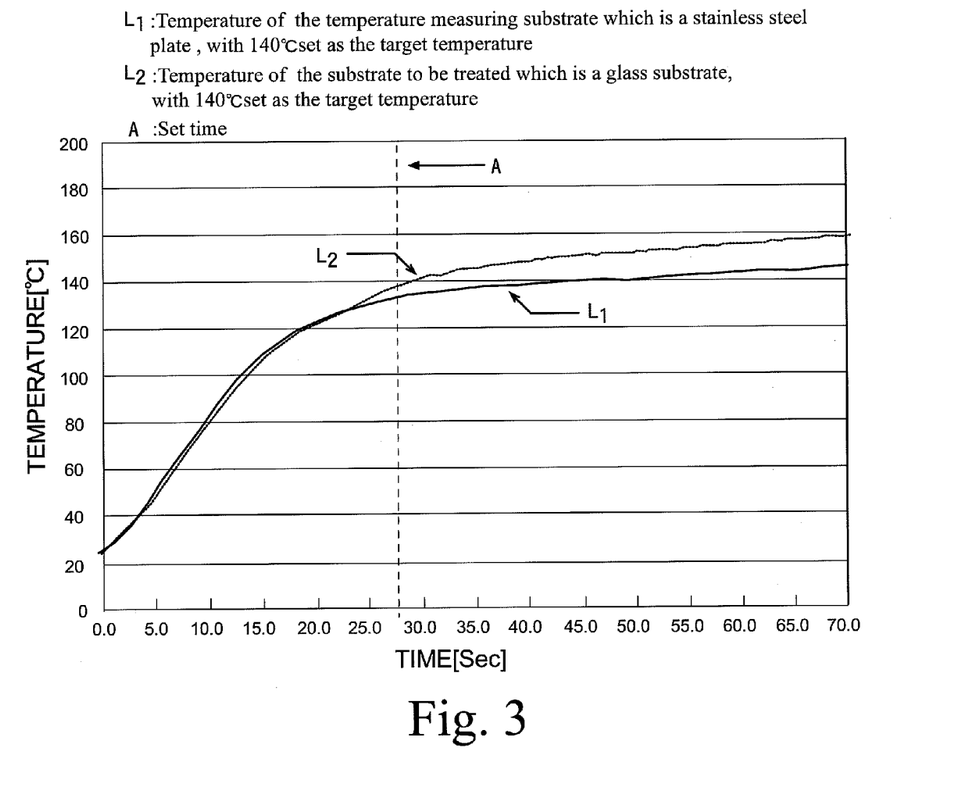
FIG. 3 is a graph showing the time variation of the temperature of a glass substrate, when the temperature of a stainless steel substrate is controlled to 140° C.

FIG. 3 shows the changes in temperature with time, respectively for the temperature $L_1$ of the temperature measurement substrate 22 and for the average temperature $L_2$ of the substrate to be heated at that time. With the dotted line A indicating the set time, as to the average temperature of the substrate to be heated 12, up to the set time, the substrate to be heated 12 being a glass substrate and the temperature measurement substrate 22 being a stainless steel plate approximately conform in the rate of the temperature rise, by which it was able to be confirmed that the control program was capable of heating the substrate to be heated 12 to the same temperature as the target temperature.

Even after the set time, the temperature difference is kept constant between the substrate to be heated 12 and the temperature measurement substrate 22, and the temperature of the substrate to be heated 12 and that of the temperature measurement substrate 22 correspond nearly one-to-one with each other, which enables the temperature of the substrate to be heated 12 to be corrected to a correct value by controlling the temperature measurement substrate 22 to take an the expected value, even when the measured temperature of the temperature measurement substrate 22 has varied from the expected value.

According to the present invention, the material of the temperature measurement substrate 22 and the material of the substrate to be heated 12 are different from each other; generally, the substrate to be heated 12 is made of a glass substrate, while the temperature measurement substrate 22 of the present invention is not limited to stainless steel and any metal is applicable, if only the metal does not discolor due to exposure to heat or does not vary in emissivity. Cu and Cu with Ni coating are desirable.

<Comparative Experiment>

In the comparative experiment, a glass plate was used as a temperature measurement substrate, and the same conditions as those of the above-discussed experiment were made use of except for the temperature measurement substrate and the control program.

The temperature measurement substrate and the substrate to be heated were heated as glass substrates. Because temperature of the temperature measurement substrate becomes lower than that of the substrate to be heated, in order to raise the temperature of the substrate to be heated to the heating temperature (140 degrees Celsius), the target temperature to which the temperature measurement substrate is made to reach is required to be set lower than the heating temperature.

Figure 4:
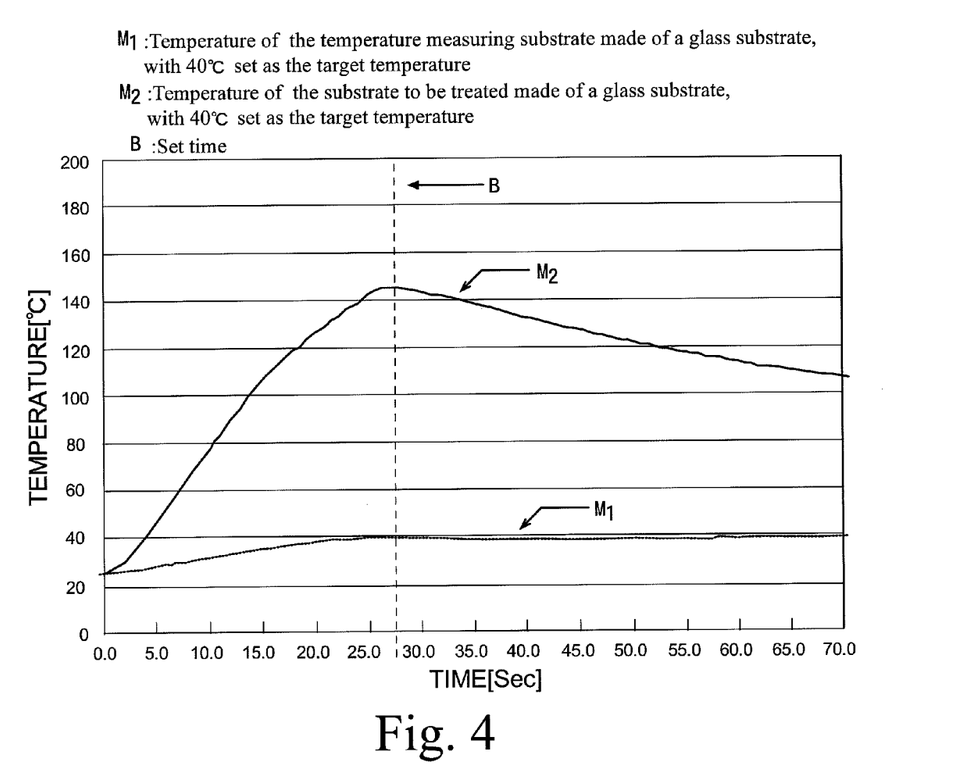
FIG. 4 is a graph showing the time variation of the temperature of a glass substrate, when the temperature of a measuring glass plate is controlled to 40° C.

FIG. 4 shows the temperature $M_1$ of the temperature measurement substrate made of a glass substrate, and the average temperature $M_2$ of a plurality of measuring points on the substrate to be heated made of a glass substrate, under the condition of the target temperature of the above-discussed program being set to 40 degrees Celsius and the substrate to be heated being attempted to be heated to the heating temperature (140 degrees Celsius); the dotted line B indicates the set time; and there is a diremption between the temperature changes of the glass substrate to be treated and the metal temperature.

Figure 5:
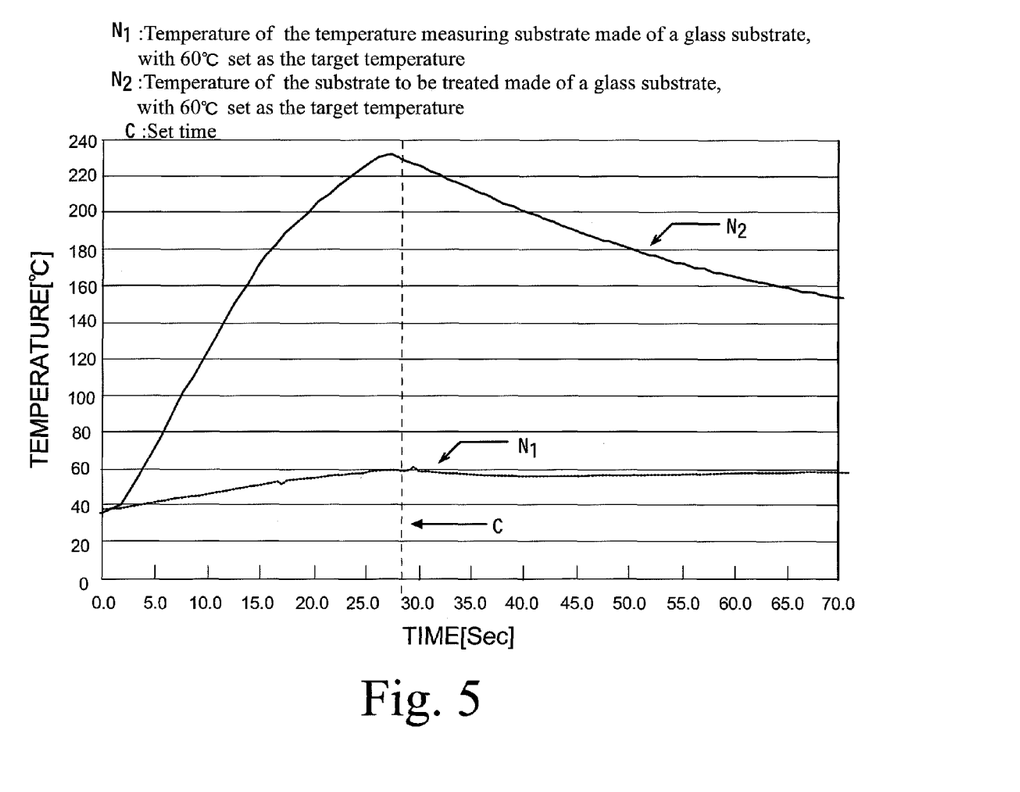
FIG. 5 is a graph showing the time variation of the temperature of a glass substrate, when the temperature of a measuring glass plate is controlled to 60° C.

FIG. 5 shows the temperature $N_1$ of the temperature measurement substrate made of a glass substrate, and the average temperature $N_2$ of the substrate to be heated made of a glass substrate, under the condition of the target temperature of the above-discussed program being set to 60 degrees Celsius and the substrate to be heated being attempted to be heated to the heating temperature (140 degrees Celsius); the dotted line C indicates the set time; and the temperature of the glass substrate to be treated overshoots the target temperature.

As shown in FIGS. 4 and 5, if the temperature of the temperature measurement substrate is corrected when temperature of the temperature measurement substrate deviates from the controlled temperature curve, the temperature of the substrate to be heated dirempts from the temperature, resulting in a large change of the temperature of the glass substrate to be treated, which makes it difficult to control.

Furthermore, since glass shows lower thermal conductivity than that of metal, a decrease in the temperature of the heated glass plate for temperature measurement by water-cooling took some time.

The comparative experiment has shown that metal is desirable for the temperature measurement substrate.

<Apparatus in the Second Embodiment of the Present Invention>

Figure 6:
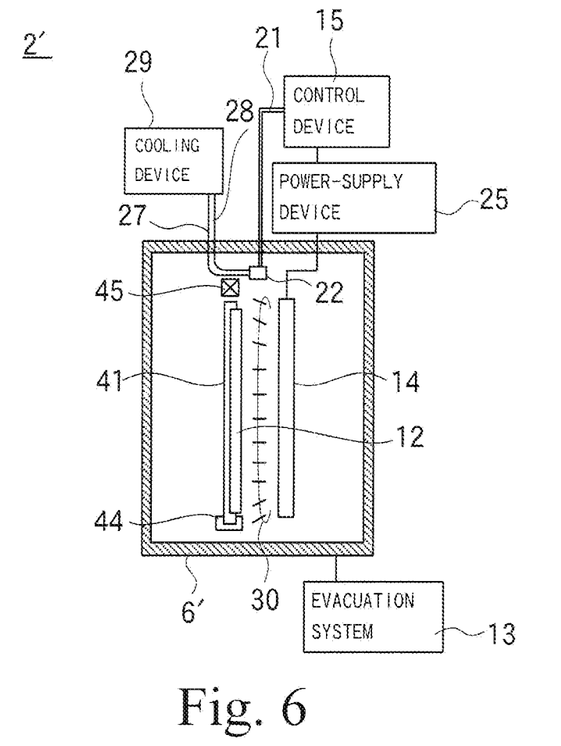
FIG. 6 is an example of the vertical substrate treatment apparatus used in an embodiment of the present invention.

The apparatus in the second embodiment of the present invention will be described below in reference to FIG. 6.

In a heating device 2' of the second embodiment of the present invention, components and devices having the same structures and the same functions as those of the above-discussed first embodiment have the same reference numerals, respectively.

The heating device 2' has a heating chamber 6', with the radiation heating means 14 which was horizontally disposed in FIG. 1 being disposed in a standing manner in the heating chamber 2'.

The heating chamber 6' has a rail device 44 in a long and thin shape being disposed at the bottom inside, and an upper support device 45 in a long and thin shape is disposed in the position directly above the rail device 44.

The substrate to be heated 12 is held by a carrier 41, and is carried from the carry-in chamber into the heating chamber 6'. The bottom part of the carrier 41 is disposed onto the rail device 44, with the upper part of the carrier 41 being held or supported by the upper support device 45 so as to prevent the carrier 41 from slanting and falling over. In this embodiment, the upper support device 45 is a magnet which magnetically attracts the upper end of the carrier 41 to hold the upper part of the carrier 41 without contacting.

At least one side face of the substrate to be heated 12 is exposed, and the exposed face is in a vertical posture or inclines at the angle within 45 degrees from vertical.

The rail device 44 is provided with a power source, so that the carrier 41 and the substrate to be heated 12 held by the carrier 41 move on the rail device 44, in a state of being held by the rail device 44 and the upper support device 45.

Inside the heating chamber 6', the radiation heating means 14 is disposed so as to face the moving route of the carrier 41; and the carrier 41 comes to a standstill in a position where the substrate to be heated 12 to be held by the carrier 41 faces the radiation heating means 14. The radiation heating means 14 is provided with power from the power-supply device 25, with input power being controlled by the control device 15, and generates heat to raise the temperature of the substrate to be heated 12 by radiation heat.

The temperature measurement substrate 22, being disposed above a region where the substrate to be heated 12 and the radiation heating means 14 face each other, is cooled down to a temperature of at least 20 degrees Celsius and at most 30 degrees Celsius by the cooling device 29, when the heating of the substrate to be heated 12 is started; and the substrate to be heated 12 is carried into the heating chamber 6' with a temperature of at least 20 degrees Celsius and at most 30 degrees Celsius.

In the same way as the above-discussed experiment, the amount of heat generation of the radiation heating means 14 is controlled by the control device 15. By measuring the temperature of the temperature measurement substrate 22, the temperature of the substrate to be heated 12 is indirectly measured, so that the temperature of the substrate to be heated 12 can be accurately controlled by controlling the amount of heat generation of the radiation heating means 14 based on the temperature of the temperature measurement substrate 22.

When the temperature of the substrate to be heated 12 is raised to the predetermined temperature, the substrate to be heated 12 inside the heating chamber 6' is moved into the treatment chamber, and cooling of the temperature measurement substrate 22 is started by the cooling device 29 down to a temperature at least 20 degrees Celsius and at most 30 degrees Celsius.

What is claimed is:

1. A temperature sensing device, for being disposed in a vacuum chamber inside which vacuum heating treatment for heating a substrate to be heated by means of radiation takes place, comprising:

a temperature measurement substrate is disposed in a non-contacting relationship to a the substrate to be heated;

a circulation passage disposed in close contact with the temperature measurement substrate so as to make a coolant flow inside the circulation passage; and a temperature sensor provided to the temperature measurement substrate for measuring the temperature of the temperature measurement substrate, wherein the temperature sensing device is such that the temperature as being output by the temperature sensor is detected when the substrate to be heated and the temperature measurement substrate disposing in a position outside a region where the radiation heating means and the substrate to be heated face each other are irradiated with infrared rays which are emitted from a radiation heating means, and wherein the temperature measurement substrate and the substrate to be heated are made of different materials, and wherein the temperature sensing device is such that when the substrate to be heated and the temperature measurement substrate are being raised in temperature by the infrared rays starting from the same temperature, the substrate to be heated and the temperature measurement substrate are raised in temperature at the same rate of the temperature-rise speed.

2. The temperature sensing device according to claim 1, wherein the temperature measurement substrate is made of a metal.

3. The temperature sensing device according to claim 1 or claim 2, wherein the temperature sensor is a temperature measuring part which generates an electromotive force for a thermocouple.

4. A heating device, comprising:
a vacuum chamber inside which vacuum heating treatment, for heating a substrate to be heated by means of radiation, takes place;
a substrate-holding device for holding the substrate to be heated in the vacuum chamber;
a radiation heating means, being disposed without contacting the substrate to be heated in the vacuum chamber, for irradiating the substrate to be heated with infrared rays,
a temperature sensing device having: a temperature measurement substrate; a circulation passage disposed in close contact with the temperature measurement substrate so as to make a coolant flow inside the circulation passage; and a temperature sensor provided to the temperature measurement substrate for measuring the temperature of the temperature measurement substrate, wherein the temperature sensing device is such that the temperature as being output by the temperature sensor is detected when the temperature measurement substrate is irradiated with infrared rays, wherein the temperature measurement substrate and the substrate to be heated are made of different materials, and the temperature sensing device is disposed in a position outside a region where the radiation heating means and the substrate to be heated face each other, and in a position so as not to block the infrared rays with which the surface of the substrate to be heated is irradiated;
a cooling device for supplying a coolant, which has been cooled, to the circulation passage of the temperature sensing device;
a power-supply device for applying power to the radiation heating means based on an input signal; and
a control device, to which an output signal of the temperature sensing device is input, the control device outputting a signal to the power-supply device indicating the power as being input into the radiation heating means, wherein
the heating device is such that the amount of power applied to the radiation heating means is controlled based on the temperature of the temperature measurement substrate which is indicated by the output signal.

5. A method for heating a substrate, during which:
a substrate to be heated is carried into a vacuum chamber; and
a surface of the substrate to be heated is irradiated with infrared rays by means of a radiation heating means being disposed without contacting the substrate to be heated in the vacuum chamber, to raise the temperature of the substrate to be heated, and comprising the steps of:
disposing a temperature measurement substrate of which a circulation passage having coolant flowed through its inside is disposed in close contact with the temperature measurement substrate, in such a manner that the temperature measurement substrate having a non-contacting relationship to the substrate to be heated is positioned outside a region where the radiation heating means and the substrate to be heated face each other in the vacuum chamber; and
when infrared rays which are emitted from the radiation heating means are radiated to the substrate to be heated and the temperature measurement substrate,
controlling the amount of emission infrared rays to the radiation heating means based on the temperature of the temperature measurement substrate which is indicated by the output of a detection signal by a temperature sensor provided to the temperature measurement substrate for measuring the temperature of the temperature measurement substrate.

6. A method for heating a substrate during which: a substrate to be heated is carried into a vacuum chamber; and a surface of the substrate to be heated is irradiated with infrared rays by means of a radiation heating means being disposed without contacting the substrate to be heated in the vacuum chamber, to raise the temperature of the substrate to be heated, wherein
a temperature sensing device having: a temperature measurement substrate; a circulation passage disposed in close contact with the temperature measurement substrate so as to make a coolant flow inside the circulation passage; and a temperature sensor provided to the temperature measurement substrate for measuring the temperature of the temperature measurement substrate, wherein the temperature sensing device is such that the temperature as being output by the temperature sensor is detected when the temperature measurement substrate is irradiated with infrared rays, and wherein the temperature measurement substrate and the substrate to be heated are made of different materials is disposed in the vacuum chamber, and wherein the amount of emission of infrared rays from the radiation heating means is controlled based on the temperature of the temperature measurement substrate which is indicated by the output by the temperature sensor of the temperature sensing device, and in which
the substrate to be heated is carried into the vacuum chamber with the substrate to be heated having a temperature of at least 20 degrees Celsius and at most 30 degrees Celsius, the method for heating comprising the steps of:
if the temperature of the temperature measurement substrate is <20 degrees Celsius or >30 degrees Celsius, passing a coolant flowing though the circulation passage of the temperature sensing device to make the temperature measurement substrate have a temperature of at least 20 degrees Celsius and at most 30 degrees Celsius; and thereafter,
starting the heating of the substrate to be heated and the temperature measurement substrate by means of the radiation heating means.

* * * * *